United States Patent
Dixon et al.

(10) Patent No.: US 7,141,643 B2
(45) Date of Patent: Nov. 28, 2006

(54) ALKYLENE OXIDE-LACTONE COPOLYMERS

(75) Inventors: Elizabeth Dixon, Fareham (GB); John Robert Moxey, Salisbury (GB)

(73) Assignee: Cognis Performance Chemicals UK Ltd., Southampton (GB)

( * ) Notice: Subject to any disclaimer, the term of this patent is extended or adjusted under 35 U.S.C. 154(b) by 79 days.

(21) Appl. No.: 10/432,021
(22) PCT Filed: Nov. 28, 2001
(86) PCT No.: PCT/GB01/05239

§ 371 (c)(1),
(2), (4) Date: Oct. 27, 2003

(87) PCT Pub. No.: WO02/46268

PCT Pub. Date: Jun. 13, 2002

(65) Prior Publication Data

US 2004/0068091 A1 Apr. 8, 2004

(30) Foreign Application Priority Data

Dec. 6, 2000 (GB) .............................. 00229750.7

(51) Int. Cl.
*C08G 63/08* (2006.01)
*C08G 63/82* (2006.01)
*C08G 63/10* (2006.01)
*C08G 65/00* (2006.01)

(52) U.S. Cl. ............. 528/354; 528/355; 528/357; 528/358; 528/359; 528/361; 528/405; 525/408; 525/411; 525/413; 525/415

(58) Field of Classification Search ............. 528/354, 528/358, 357, 359, 361, 411, 415, 355; 525/408, 525/411, 413, 415
See application file for complete search history.

(56) References Cited

U.S. PATENT DOCUMENTS

| | | | |
|---|---|---|---|
| 3,312,753 A | 4/1967 | Bailey, Jr. et al. | |
| 3,689,531 A | 9/1972 | Critchfield et al. | |
| 4,289,873 A * | 9/1981 | Kubo et al. | 528/357 |
| 4,357,462 A * | 11/1982 | Kubo et al. | 528/357 |
| 5,032,671 A | 7/1991 | Harper | |
| 5,525,702 A | 6/1996 | Nace | |
| 5,785,894 A | 7/1998 | Schofield et al. | |
| 6,046,274 A | 4/2000 | Grandjean et al. | |
| 6,346,599 B1 * | 2/2002 | Goldberg et al. | 528/354 |
| 6,599,519 B1 * | 7/2003 | Seo et al. | 424/426 |
| 6,794,484 B1 * | 9/2004 | Newman et al. | 528/354 |
| 6,831,149 B1 * | 12/2004 | Newman et al. | 528/354 |

FOREIGN PATENT DOCUMENTS

| | | |
|---|---|---|
| JP | 63-189434 | 8/1988 |
| WO | WO 97/10849 | 3/1997 |

* cited by examiner

*Primary Examiner*—P. Hampton Hightower
(74) *Attorney, Agent, or Firm*—Nixon & Vanderhye

(57) ABSTRACT

A block copolymer is disclosed, which comprises a first block comprising polymerized units of an alkylene oxide and a second block comprising polymerized units of an alkylene oxide and a lactone, said copolymer being obtainable by polymerizing an alkylene oxide in the presence of an organic initiator to form said first block, and reacting the first block with a mixture of an alkylene oxide and a lactone. Such copolymers are found to have improved foam inhibition characteristics while maintaining their biodegradable properties.

12 Claims, No Drawings

ALKYLENE OXIDE-LACTONE COPOLYMERS

This application is the U.S. national phase of international application PCT/GB01/05239, filed 28 Nov. 2001, which designated the U.S.

This invention relates to alkylene oxide-lactone copolymers, and their uses.

Co- and homo-polymers of alkylene oxide are widely used as non-ionic surfactants, foam control agents, mineral wetting agents, emulsifiers, de-emulsifiers, dispersants, and synthetic lubricants. In particular, polyoxyalkylene copolymers made from propylene oxide, 1,2-buttlene oxide and ethylene oxide represent a major class of such materials.

Alkylene oxide-lactone block copolymers are also known to be useful for similar applications. U.S. Pat. No. 5,525,702, for example, describes a copolymer comprising a first block comprising polymerised units of one or more alkylene oxides and one or more lactones, and a second block comprising polymerised units of one or more alkylene oxides. Such compounds are prepared by polyrnerising the lactone and alkylene oxide monomers of the first block in the presence of an organic initiator, and then capping the resulting polymer with the alkylene oxide monomer of the second block The presence of a lactone in the first block of U.S. Pat. No. 5,525,702 is said to introduce ester functionality into the copolymer, which in turn, enhances its overall biodegradability.

We have now found that by introducing a lactone into the second block of the copolymer rather than the first, the foam inhibiting properties of the compound may be enhanced without compromising the enhanced biodegradability afforded by the presence According to the present invention, there is provided a block copolymer comprising a first block comprising polymerised units of an alkylene oxide and a second block comprising polymerised units of an alkylene oxide and a lactone, said copolymer being obtainable by:

polymerising an alkylene oxide in the presence of an organic initiator to form said first block, and reacting the first block with a mixture of an alkylene oxide and a lactone.

Typically, one end of the first block is bonded directly to the organic initiator, whilst the other end of the first block is bonded directly to the second block of the copolymer of the present invention. The recurrence of the alkylene oxide and lactone groups within second block is typically random, but may contain some degree of block character.

The copolymer of the present invention may have a molecular weight of 200 to 6000, preferably, 400 to 4000, most preferably 500 to 2500. The molecular weight of the first block is typically 200 to 3000, preferably 200 to 1000 and most preferably 250 to 600; whilst the molecular weight of the second block is typically no more than 6000, preferably 500 to 4000 and most preferably 1000 to 3000.

The number of monomer units in each of the first and second blocks may independently range from 1 to 100, preferably 5 to 50. In the second block, the mole ratio of alkylene oxide to lactone units may range up to 99:1, but is preferably 10:1 or less.

The alkylene oxide components of the copolymer include those of formula (I)

Formula (I)

in which each R is independently hydrogen, $C_1$–$C_6$ alkyl or $C_1$–$C_6$ haloalkyl. Alternatively, the two R substituents may, together with both vicinal epoxy carbons, form a saturated or monoethylenically unsaturated cycloaliphatic hydrocarbon ring, of preferably five or six carbon atoms. The preferred alkylene oxide monomers contain 2 to 12 carbon atoms. Examples include ethylene oxide, propylene oxide, butylene oxides, 1,2-epoxydodecane, cyclopentene oxide, cyclohexene oxide and styrene oxide. Of these, butylene oxides (particularly 1,2-butylene oxide), propylene oxide and ethylene oxide are most preferred. The alkylene oxide of the first block may be the same as the alkylene oxide of the second block. Preferably, however, the alkylene oxides of the first and second blocks are different. In a preferred embodiment, for example, ethylene oxide is employed to form the first block of the copolymer, whilst propylene oxide or 1,2-butylene oxide is employed to form the second block of the copolymer.

The alkylene oxide portions of both first and second blocks of the copolymers of the present invention may optionally comprise mixtures of alkylene oxide monomers, e.g. a mixture of ethylene and propylene oxides.

The lactone used in the present invention may be any lactone or combination of lactones having at least four carbon atoms in the ring, and these lactones include those of formula (II)

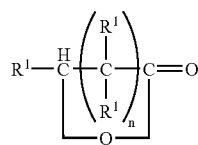

Formula (II)

in which when n is at least 1 and each $R^1$ is independently hydrogen, $C_1$–$C_4$ alkyl, $C_1$–$C_6$ cycloalkyl, $C_1$–$C_4$ alkoxy or single ring aromatic hydrocarbon; with the proviso that when n is 2, at least four $R^1$ in total are hydrogen.

The lactones preferred as starting materials for the second block of the present invention include unsubstitued ε-caprolactones, ε-caprolactones substituted on the carbon atoms in the ring by one, two or three lower (e.g. one to four carbon atoms) alkyl radicals, and unsubstituted δ-valerolactones and γ-butyrolactones. The preparation of unsubstituted lactones is well known. The substituted c-caprolactones, and mixtures of such lactones, can readily be prepared by reacting a corresponding substituted cyclohexanone with an oxidizing agent such as peracetic acid. The cyclohexanones may be obtained from substituted phenols or by other convenient synthetic routes. Other lactones that are suitable as starting materials include alkoxy ε-caprolactones such as methoxy and ethoxy ε-caprolactone, cycloalkyl, aryl and aralkyl ε-caprolactones such as cyclohexyl, phenyl and benzyl ε-caprolactone, and lactones such as ζ-enantholactone and η-caprylactone which have more than six carbon atoms in the ring.

The ε-caprolactones are the preferred lactones used to make the second block of the copolymer of the present invention. These include those of formula (III)

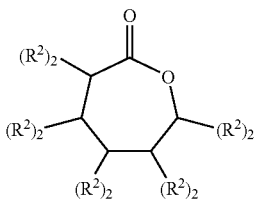

Formula (III)

in which each $R^2$ is independently either hydrogen or a $C_1$–$C_4$ alkyl or $C_1$–$C_4$ alkoxy radical, with the proviso that no more than three $R^2$ substituents are groups other than hydrogen. Unsubstituted ε-caprolactone is the preferred ε-caprolactone.

The copolymer is prepared by first polymerizing an alkylene oxide or mixture of alkylene oxides using an organic initiator. The initiator is preferably mono-functional. Examples include alcohols, amines, mercaptans, phenols, amino alcohols and mercapto alcohols. Hydroxyl and amino terminated initiators are preferred.

Suitable monohydroxyl initiators include those represented by the formula (IV)

$$R^3(OR^4)_aOH \quad \quad \quad (IV)$$

in which $R^3$ is hydrocarbyl such as alkyl, cycloalkyl, aryl, aralkyl, alkaryl, etc., preferably containing up to 18 carbon atoms; $R^4$ is an alkylene radical preferably containing from two to four carbon atoms; and a is an integer having a value of 0 to 18, preferably a value of 0 to 2. Illustrative monohydroxyl initiators include the alkanols, e.g. methanol, ethanol, isopropanol, n-butanol, 2-ethylhexanol, dodecanol, tridecanol, and tetradecanol; the monoalkyl ethers of glycols and polyglycols, e.g., 2-ethoxyethanol, 2-propoxyethanol, 2-butoxyethanol, the mono ethyl ethers of diethylene glycol, of triethylene glycol, of tripropylene glycol; the monopropyl ethers of polyethylene glycol, of polypropylene glycol, of polybutylene glycol; and the alkylene oxide adducts of substituted and unsubstituted phenols, e.g. the ethylene oxide and/or propylene oxide adducts of alkylphenols such as nonylphenol. Mixtures of organic initiators may be employed.

The initiator may alternatively be polyfunctional. Preferred polyfunctional initiators have at least two and possibly up to 20 reactive hydrogens in the form of hydroxyl groups. The polyfunctional initiators include compounds of the formula (V)

$$R^5(YH)_b \quad \quad \quad (V)$$

where $R^5$ is an aliphatic, aromatic or heterocyclic radical, b is at least 2, and each Y is —O—, —S—, —NH— or $NR^6$ where $R^6$ is hydrocarbyl. Preferred such initiators are diols, polyols, diamines, hydroxy amines and thiols, such as ethylene/propylene glycol, diethylene/dipropylene glycol, 1,2-dibutylene glycol, glycerine, trimethylol propane, pentaerythritol, ethylenediamine, ethanolamine etc. Such compounds may also be ethoxylated.

The polymerisation of alkylene oxide and/or alkylene oxide and lactone may be carried out in the presence of a catalyst. Any catalyst that will promote the necessary polymerization reaction may be employed. Representative catalysts include alkali metal and alkaline earth hydroxide, and Lewis acids. Preferred catalysts are the alkali hydroxides, particularly potassium hydroxide (KOH). The catalyst may be used in catalytically significant amounts which is a function of many variables, including the nature and quantities of reactants, temperature, mixing, and the like. Catalyst concentrations of about 0.001 to about 2 weight percent are typical, with a concentration of about 0.01 to about 1 weight percent being preferred. It may be necessary to neutralise the catalyst prior to recovering the polymer product.

The copolymer of the present invention may be prepared at a reaction temperature of 75 to 175° C., preferably 85 to 150° C. These temperature ranges may be suitable for the formation of both the first and second blocks of the copolymer of the present invention. Reaction pressures range from, but are not limited to, 1 to 15 bar, preferably 6 to 10 bar. Preferably, anhydrous conditions are employed. The reaction may be performed on a batch, semicontinuous or continuous basis.

The copolymers of the present invention are useful, among other things, as nonionic surfactants, foam control agents and lubricants.

According to a further aspect of the present invention, there is provided a process for producing a block copolymer having a first block comprising polymerised units of an alkylene oxide and a second block comprising polymerised units of an alkylene oxide and a lactone, said process comprising:

polymerising an alkylene oxide using an organic initiator to form said first block, and reacting the first block with a mixture of an alkylene oxide and a lactone.

In a further embodiment of the invention, the second block itself comprises alternate blocks of alkylene oxide and lactone rather than randomly distributed units of each as in the above-described cases. Preferably the total number of blocks of alkylene oxide and lactone in the copolymer is between 5 and 9. Preferably the copolymer has at least 3 units of alkylene oxide in each block thereof, or 2 units of lactone in each block thereof. In the process associated with this embodiment, instead of being reacted with a mixture of alkylene oxide and lactone, the first block is reacted alternately with either alkylene oxide or lactone. The number of such reactions is preferably between 4 and 8 (so as to give between 5 and 9 blocks in total).

EXAMPLES

Biodegradability

Example 1

To a mixture of ethoxylated dodecanol/tetradecanol (available commercially as Softanol 120, a product of the Nippon shokubai company), molecular weight 711, was added potassium hydroxide as catalyst. To this mixture was added a blend of propylene oxide (4 parts molar) and caprolactone (1 part molar) in a pressurised vessel inerted with nitrogen, reaction occurring at a temperature of 120 to 130° C., such that the final product had a theoretical molecular weight of 2990.

| Biodegradability [OECD 301b Sturm test, 28 days] | 85% |
|---|---|
| Cloud point [1% aqueous] | 6–8° C. |

Example 2

To a mixture of ethoxylated dodecanol/tetradecanol (available commercially as Softanol 120, a product of the Nippon shokubai company), molecular weight 711, was added potassium hydroxide as catalyst. To this mixture was added a blend of propylene oxide (5 parts molar) and caprolactone (1 part molar) in a pressurised vessel inerted with nitrogen, reaction occurring at a temperature of 120 to 130° C., such that the final product had a theoretical molecular weight of 1740.

| Biodegradability [OECD 301b Sturm test, 28 days] | 55% |
|---|---|
| Cloud point [1% aqueous] | 6–8° C. |

Example 3

To a mixture of ethoxylated dodecanol/tetradecanol (available commercially as Softanol 120, a product of the Nippon shokubai company), molecular weight 683, was added potassium hydroxide as catalyst. To this mixture was added a blend of propylene oxide (2.5 parts molar) and caprolactone (1 part molar) in a pressurised vessel inerted with nitrogen, reaction occurring at a temperature of 120 to 130° C., such that the final product had a theoretical molecular weight of 1176.

| Biodegradability [OECD 301b Sturm test, 28 days] | 60% |
|---|---|
| Cloud point [1% aqueous] | 15° C. |

Example 4 (Comparative)

To a mixture of ethoxylated dodecanol/tetradecanol (available commercially as Softanol 120, a product of the Nippon shokubai company), molecular weight 700, was added potassium hydroxide as catalyst. To this mixture was added a blend of propylene oxide in a pressurised vessel inerted with nitrogen, reaction occurring at a temperature of 120 to 130° C., such that the final product had a theoretical molecular weight of 2800.

| Biodegradability [OECD 301b Sturm test, 28 days] | 7% |
|---|---|
| Cloud point [1% aqueous] | 8–15° C. |

The above results show very clearly that the presence of the lactone, even though in the second block rather than the first, substantially improves biodegradability.

Antifoam Properties

Example 5

To a mixture of principally $C_{12}/C_{13}$ primary alcohols (available commercially from Condea as Lial 123), was added potassium hydroxide as catalyst. The mixture was then ethoxylated with 12 molar equivalents of ethylene oxide in a pressurised vessel inerted with nitrogen, reaction occurring at a temperature of 120 to 130° C. To this intermediate was added a blend of propylene oxide (4 parts molar) and cap at rolactone (1 part molar), such that this blend made up 76% of the final composition.

The resulting copolymer had a cloud point of <8° C.

The anti-foam properties of the resulting copolymer were tested according to the following procedure, which is a variation of the standard test method IP 146/73.

The apparatus for performing the foaming test comprised a 1000 ml measuring cylinder immersed in a water bath at the appropriate temperature. 200 ml of sample (usually a sugar/saponin solution) was placed in the measuring cylinder and allowed to reach the temperature at which the water bath was set (usually 25° C. for FCC P12 antifoam testing). An air pipe having a diffuser stone at its open end was placed into the sample, and air blown through at a fixed rate for a set period of time. After a certain measured length of time (2–5 minutes) the height of foam in the measuring cylinder was recorded. The volume of foam created could then be compared with the volume of foam produced when the antifoam polymer (typically between 25 and 100 ppm) had been added to the sample.

The results are shown in Table 1 below.

Example 6 (Comparative)

To a mixture of principally $C_{12}/C_{13}$ primary alcohols (available commercially from Condea as Lial 123), was added potassium hydroxide as catalyst. To this mixture was added a blend of propylene oxide (4 parts molar) and caprolactone (1 part molar) in a pressurised vessel inerted with nitrogen, reaction occurring at a temperature of 120 to 130° C. such that this blend (propylene oxide/caprolactone) made up 76% weight of the final composition. The intermediate was then ethoxylated with 12 molar equivalents of ethylene oxide (relative to the Lial 123).

The resulting copolymer has a cloud point of <8° C.

The anti-foam properties of the resulting copolymer were tested in the manner of Example 1. As can be seen from Table 1, the properties of Example 6, in which the lactone is present in the first block rather than the second, are inferior to those of Example 5.

TABLE 1

| foam heights (ml) at different antifoam concentrations | | | |
|---|---|---|---|
| Antifoam conc. | 0 ppm | 50 ppm | 100 ppm |
| Example 5 | 650 | 440 | 150 |
| Example 6 | 650 | 560 | 480 |

Multiple Block Copolymer

Example 7

Softanol 30, a 3 mole ethoxylate of dodecanol/tetradecanol, was further ethoxylated using potassium hydroxide catalyst to give a total of 12 moles of ethylene oxide. The product was then reacted sequentially with caprolactone, propylene oxide, caprolactone, propylene oxide, caprolactone and finally propylene oxide, to give a total of 7 blocks of EO, PO and caprolactone.

The mole ratio of caprolactone to PO overall was 1:4, with each block of caprolactone and PO containing one-third of the total amount of caprolactone and PO respectively present in the copolymer. The theoretical molecular weight was 2990.

What is claimed is:

1. Block copolymer which comprises a first block comprising polymerised units of an alkylene oxide, an organic initiator bonded directed to one end of said first block, and a second block bonded directly to the other end of said first block, said second block comprising polymerised units of an alkylene oxide and a lactone, said copolymer being obtainable by:
    polymerising an alkylene oxide in the presence of an organic initiator to form said first block with said initiator directly bonded thereto, and
    reacting the first block with a mixture of an alkylene oxide and a lactone to form said block copolymer.

2. Copolymer according to claim 1, wherein the alkylene oxide components thereof comprise those of formula (I)

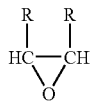

Formula (I)

in which each R is independently hydrogen, $C_1$–$C_6$ alkyl or $C_1$–$C_6$ haloalkyl, or the two R substituents, together with both vicinal epoxy carbons, form a saturated or monoethylenically unsaturated cycloaliphatic hydrocarbon ring.

3. Copolymer according to claim 2, wherein the alkylene oxide components thereof comprise ethylene oxide, propylene oxide, butylene oxides, 1,2-epoxydodecane, cyclopentene oxide, cyclohexene oxide or styrene oxide.

4. Copolymer according to claim 1, wherein the alkylene oxides of the first and second blocks are different.

5. Copolymer according to claim 1, which comprises lactones having the formula (II)

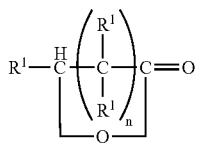

Formula (II)

in which when n is at least 1 and each $R^1$ is independently hydrogen, $C_1$–$C_4$ alkyl, $C_1$–$C_6$ cycloalkyl, $C_1$–$C_4$ alkoxy or single ring aromatic hydrocarbon; with the proviso that when n is 2, at least four $R^1$ substituents in total are hydrogen.

6. Copolymer according to claim 5, wherein the lactone comprises unsubstitued ε-caprolactones, ε-caprolactones substituted on the carbon atoms in the ring by one, two or three $C_1$–$C_4$ alkyl radicals, unsubstituted δ-valerolactones, or γ-butyrolactones.

7. Copolymer according to claim 6, wherein the lactone has the formula (III)

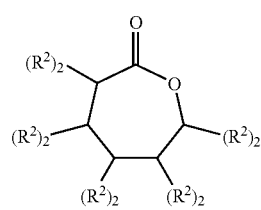

Formula (III)

in which each $R^2$ is independently either hydrogen or a $C_1$–$C_4$ alkyl or $C_1$–$C_4$ alkoxy radical, with the proviso that no more than three $R^2$ substituents are groups other than hydrogen.

8. Copolymer according to claim 1, wherein the molecular weight of the first block is 200 to 3000, and the molecular weight of the second block is no more than 6000.

9. Copolymer according to claim 1, wherein the number of monomer units in each of the first and second blocks is independently between 1 and 100, and/or in the second block, the mole ratio of alkylene oxide to lactone units is 10:1 or less.

10. Copolymer according to claim 1, wherein the recurrence of the alkylene oxide and lactone groups within second block is random.

11. Copolymer according to claim 1, wherein the second block comprises a total of between 5 and 9 alternate blocks of alkylene oxide and lactone, each block comprising at least 3 units of alkylene oxide or 2 units of lactone.

12. Process for producing a block copolymer having a first block comprising polymerised units of an alkylene oxide and a second block comprising polymerised units of an alkylene oxide and a lactone, said process comprising:
    polymerising an alkylene oxide using an organic initiator to form said first block, and
    reacting the first block either with a mixture of an alkylene oxide arid a lactone, or alternately with either alkylene oxide or lactone.

* * * * *